US008458284B2

(12) United States Patent
Huang et al.

(10) Patent No.: US 8,458,284 B2
(45) Date of Patent: Jun. 4, 2013

(54) SYSTEMS AND METHODS FOR EFFICIENT LIVE APPLICATION MIGRATION WITHIN BANDWIDTH CONSTRAINED NETWORKS

(75) Inventors: Hai Huang, Marion, OH (US); Yaoping Ruan, White Plains, NY (US); Sambit Sahu, Mahopac, NY (US); Anees A. Shaikh, Yorktown Heights, NY (US); Kunwadee Sripanidkulchai, White Plains, NY (US); Sai Zeng, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 1021 days.

(21) Appl. No.: 12/483,289

(22) Filed: Jun. 12, 2009

(65) Prior Publication Data

US 2010/0318608 A1 Dec. 16, 2010

(51) Int. Cl.
*G06F 15/167* (2006.01)
(52) U.S. Cl.
USPC ............. 709/213; 709/223; 709/230; 714/15; 714/16; 714/17; 714/18
(58) Field of Classification Search
None
See application file for complete search history.

(56) References Cited

U.S. PATENT DOCUMENTS

| | | | | |
|---|---|---|---|---|
| 7,457,722 B1* | 11/2008 | Shain et al. | ................... | 702/182 |
| 7,606,868 B1* | 10/2009 | Le et al. | ......................... | 709/211 |
| 7,680,919 B2* | 3/2010 | Nelson | .......................... | 709/223 |
| 7,681,075 B2* | 3/2010 | Havemose et al. | ............. | 714/15 |
| 7,702,843 B1* | 4/2010 | Chen et al. | ........................ | 711/6 |
| 7,716,446 B1* | 5/2010 | Chen et al. | ..................... | 711/170 |
| 7,882,326 B2* | 2/2011 | Armstrong et al. | .......... | 711/173 |
| 7,970,913 B2* | 6/2011 | Machulsky et al. | ........... | 709/227 |
| 8,082,468 B1* | 12/2011 | Backensto et al. | .............. | 714/15 |
| 8,117,495 B2* | 2/2012 | Graham et al. | ................. | 714/11 |
| 8,146,082 B2* | 3/2012 | Belay | ................ | 718/1 |
| 8,150,971 B2* | 4/2012 | Lublin et al. | .................. | 709/226 |
| 8,191,069 B2* | 5/2012 | Watanabe et al. | ............ | 718/104 |
| 8,195,722 B1* | 6/2012 | Havemose et al. | ........... | 707/821 |
| 8,195,981 B2* | 6/2012 | Gollub et al. | .................. | 714/17 |
| 8,201,165 B2* | 6/2012 | Nair | .................. | 718/1 |
| 8,214,829 B2* | 7/2012 | Neogi et al. | ..................... | 718/1 |
| 8,224,885 B1* | 7/2012 | Doucette et al. | .............. | 709/201 |
| 8,245,013 B2* | 8/2012 | Ganesh et al. | ................ | 711/209 |
| 8,260,904 B2* | 9/2012 | Nelson | .......................... | 709/223 |
| 8,281,013 B2* | 10/2012 | Mundkur et al. | ............. | 709/226 |
| 2007/0016904 A1* | 1/2007 | Adlung et al. | ..................... | 718/1 |
| 2007/0260733 A1* | 11/2007 | Havemose et al. | .......... | 709/226 |
| 2008/0059726 A1* | 3/2008 | Rozas et al. | ................... | 711/156 |
| 2008/0235757 A1* | 9/2008 | Li | ..................... | 726/1 |
| 2008/0256327 A1* | 10/2008 | Jacobs et al. | .................. | 711/207 |
| 2008/0295095 A1* | 11/2008 | Watanabe et al. | ................. | 718/1 |

(Continued)

*Primary Examiner* — Backhean Tiv
(74) *Attorney, Agent, or Firm* — Gibb & Riley, LLC; Louis J. Percello, Esq.

(57) ABSTRACT

A system for transferring a live application from a source to a target machines includes memory capture component that monitors and captures memory segments associated with one or more memories, one or more sets of these memory segments comprising one or more applications, the memory segments changing while the live application is in execution. A frequency ranking component organizes the memory segments in an order determined by memory segment change frequency. A link identification component identifies one or more connecting links to one or more sets of peer machines, each set of machines connecting said source machine to said target machine, the link identifier further determining the bandwidth associated with each connecting link. A routing component preferentially routes one or more of the memory segments over said connecting links based on said order.

24 Claims, 7 Drawing Sheets

U.S. PATENT DOCUMENTS

| | | | |
|---|---|---|---|
| 2009/0070760 A1* | 3/2009 | Khatri et al. | 718/1 |
| 2009/0089781 A1* | 4/2009 | Shingai et al. | 718/1 |
| 2009/0138752 A1* | 5/2009 | Graham et al. | 714/4 |
| 2009/0204718 A1* | 8/2009 | Lawton et al. | 709/230 |
| 2009/0222558 A1* | 9/2009 | Xu et al. | 709/224 |
| 2009/0276771 A1* | 11/2009 | Nickolov et al. | 717/177 |
| 2009/0293055 A1* | 11/2009 | Carroll et al. | 718/1 |
| 2010/0023565 A1* | 1/2010 | Colbert et al. | 707/204 |
| 2010/0054129 A1* | 3/2010 | Kuik et al. | 370/235 |
| 2010/0071025 A1* | 3/2010 | Devine et al. | 726/1 |
| 2010/0180275 A1* | 7/2010 | Neogi et al. | 718/1 |
| 2010/0241785 A1* | 9/2010 | Chen et al. | 711/6 |
| 2010/0250824 A1* | 9/2010 | Belay | 711/6 |
| 2010/0299666 A1* | 11/2010 | Agbaria et al. | 718/1 |
| 2010/0318608 A1* | 12/2010 | Huang et al. | 709/205 |
| 2012/0030674 A1* | 2/2012 | Mundkur et al. | 718/1 |

* cited by examiner (CONVENTIONAL TRANSFER)

| MEMORY SEGMENT ID | CHANGE FREQUENCY |
|---|---|
| 1 | 1 |
| 2 | 1 |
| 3 | 1 |
| 4 | 1 |
| 5 | 8 |
| 6 | 10 |
| 7 | 1 |
| 8 | 1 |
| 9 | 2 |
| 10 | 5 |
| 11 | 1 |
| 12 | 2 |

FIG. 5

| LINK ID | MEMORY SEGMENT ID |
|---------|-------------------|
| 1 | 1, 2 |
| 2 | 6, 5 |
| 3 | 3, 4 |
| 4 | 7, 8 |
| 5 | 9, 10 |
| 6 | 11, 12 |

FIG. 7

| LINK ID | BANDWIDTH |
|---------|-----------|
| 1 | 10 |
| 2 | 100 |
| 3 | 30 |
| 4 | 30 |
| 5 | 30 |
| 6 | 30 |
| 7 | 200 |

FIG. 6

SYSTEMS AND METHODS FOR EFFICIENT LIVE APPLICATION MIGRATION WITHIN BANDWIDTH CONSTRAINED NETWORKS

BACKGROUND

1. Field of the Invention

The embodiments of the invention generally relate to application processing and, more specifically, to live application migration within bandwidth constrained networks.

2. Description of the Related Art

Virtualization technologies are currently being proposed to enable services such as the live migration of complete applications in a seamless manner. Live migration typically refers to the scenario where a running application that is hosted on a virtual machine (VM) environment at a source machine is migrated to a target machine with as little service disruption as possible. Most current usage is limited to live migration inside a single local area network (LAN) environment. However, there are business use cases that make live migration across wide area network very compelling. For example, live migration across wide area networks would be useful in an emergency evacuation of a data center for security reasons; an emergency response to a natural disaster such as earthquake or storm that requires migration to distant data centers; the strategic migration of hosted services in order to lower costs or the like.

However, proposed techniques for live application migration in controlled LAN environments are not very efficient in wide area network environments since even transient bandwidth limitations adversely affect the live migration.

In view of the foregoing, there exists a need for systems and methods for efficient live application migration within bandwidth constrained networks.

SUMMARY

In a first aspect of the invention, there is described a system for transferring a live (running) application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order.

In a second aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein memory segments associated with higher change frequency are preferentially assigned to said links associated with higher bandwidth.

In a third aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein memory segments are assigned to the links in a monotonically decreasing order of change frequency and bandwidth.

In a fourth aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, in which the one or more sets of peer machines only execute memory segment transfer protocols.

In a fifth aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, in which the memory segment transfer protocols are implemented in at least one of: a proxy, an application and a network layer.

In a sixth aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein the bandwidth calculation further comprises a determination of the latency and quality of the link.

In a seventh aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein the live application is a virtual machine.

In an eighth aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein the live application is an application executing within a virtual machine.

In a ninth aspect of the invention, there is described a system for transferring a live application from a source machine to a target machine comprising a memory capture component that monitors and captures memory segments associated with one or more memories, one or more sets of these memory segments comprising one or more applications, the memory segments changing while the live application is in execution, a frequency ranking component that organizes the memory segments in an order determined by memory segment change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the memory segments over said connecting links based on said order, wherein the ranking component first transfers clean unused pages from the source to the target.

In a tenth aspect of the invention, there is described a system for transferring a live application from a source machine to a target machine comprising a data capture component that monitors and captures data records, one or more sets of these data records associated with one or more applications, the data records changing while the live application is in execution, a frequency ranking component that organizes the data records in an order determined by data record change frequency, a link identification component that identifies one or more connecting links to one or more sets of peer machines, each set of machines connecting said source machine to said target machine, the link identifier further determining the bandwidth associated with each connecting link, a routing component that preferentially routes one or more of the data records over said connecting links based on said order.

BRIEF DESCRIPTION OF THE SEVERAL VIEWS OF THE DRAWINGS

The embodiments of the invention will be better understood from the following detailed description with reference to the drawings, which are not necessarily drawing to scale and in which:

FIG. 5 is an exemplary data structure for storing memory-change frequency information according to an aspect of this invention;

FIG. 6 is an exemplary data structure for storing link-bandwidth information according to an aspect of this invention;

FIG. 7 is an exemplary data structure for storing link-memory segment information according to an aspect of this invention.

DETAILED DESCRIPTION

The embodiments of the invention and the various features and advantageous details thereof are explained more fully with reference to the non-limiting embodiments that are illustrated in the accompanying drawings and detailed in the following description. As mentioned above, there remains a need for systems and methods for efficient live application migration within bandwidth constrained networks.

Figure 1:
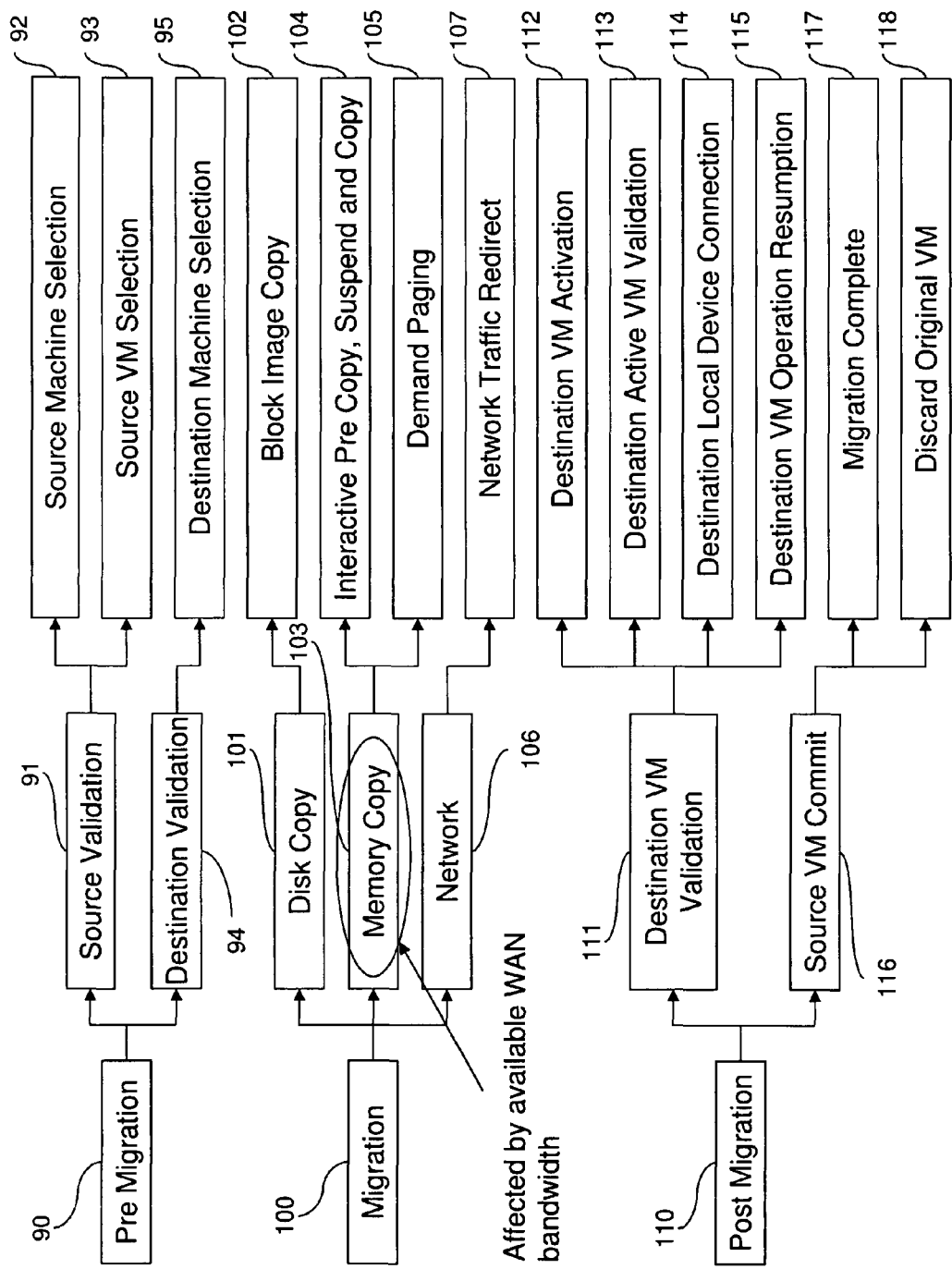
FIG. 1 is an overview of a live application migration.

FIG. 1 is an overview of a live application migration. The main steps in live migration of a virtual machine application in the local area network (LAN) environment comprise transferring memory segments associated with a live application between a virtual machine executing on a source location machine and virtual machine executing on a target location machine. A number of steps are used to perform the live migration.

During the pre-migration steps 90, a source machine 92 and a source virtual machine (VM) 93 are selected during source validation 91. A destination machine 95 is then selected during the destination validation 94.

During the migration steps 100, a block image copy 102 is performed for the disk copy 101. Iterative pre-copy, suspend and copy 104 followed by demand page copying 105 are used to perform the memory copy 103. The step is sensitive to available wide area network (WAN) bandwidth constraints. The network traffic is then re-directed 107 in the network step 106.

During post-migration 110, the destination virtual machine (VM) is activated 112, validated 113, connected to local devices 114 and the destination virtual machine (VM) resumes operation 115 during the virtual machine (VM) validation 111. The migration is completed 117 and the original virtual machine (VM) is discarded 118 during the source virtual machine (VM) commit step 116.

During the iterative pre-copy 104, each memory segment is copied, even memory segments currently in use. The source virtual machine application is then stopped and the demand paging working set is copied 105 from the source location machine to the target location machine. A switch is then made to forward 107 all requests to the virtual machine executing on the target location machine.

It is important to transfer the memory segments of the application executing within the virtual machine operating on the source location machine as soon as possible to the target location machine. This allows the application executing within the virtual machine of the target location machine to be resumed without fewer interruptions. The available network bandwidth is useful in reducing the delay or interruption to the service associated with the live migration. If the available network bandwidth is severely limited, stopping the virtual machine application may take too long. A longer synchronization time increases the probability of changed or dirty memory segments—thus increasing the iterative memory segment copy cycle.

Thus, in one exemplary embodiment according to this invention, a system for efficient live application migration within bandwidth constrained networks executes on source machine A, target machine B and one or more proxy machines $C_{1-n}$. However, it should be apparent that various other embodiments according to this invention situate the system for efficient live application migration in bandwidth constrained networks at any location accessible by source machine A, target machine B and one or more proxy machines $C_{1-n}$.

In another exemplary embodiment according to this invention, a block image copy first transfers clean or unused pages from the source to the target. The transfer of the dirty or used pages is then performed.

Thus, in one embodiment, a proxy machine C is selected if the network bandwidth between a source location machine A and a target location machine B is severely limited. Instead of the systems and methods for efficient live application migration within bandwidth constrained networks executing within the virtual machine at target location machine B perform a synchronization with the virtual machine at source location machine A, it instead synchronizes with a virtual machine at proxy machine C. In this case, the available bandwidth between target location machine B and proxy location machine C is high. Note that it is always possible to choose a proxy at least by placing proxy machine C inside the LAN where target location machine B is located.

In one case, the bandwidth between the source location machine A and the proxy machine C is not very high. That is, there is no network path from source location machine A that has better bandwidth compared to the bandwidth between source location machine A and target location machine B. In this case, the system for efficient live application migration initiates one connection between the source location machine A and the proxy machine C and a second connection between source location machine A and target location machine B. The memory segment to be transferred is divided between the target location machine B and the proxy machine C. In one exemplary embodiment, the memory segment to be transferred is divided proportionately between the two links based on the proportion of bandwidth each link provides. Thus, with multiple links available for the multi-connection transfer, the memory segment transfer time is reduced proportionately.

In various exemplary embodiments according to this invention, the proxy machine is a full fledged virtual machine mimicking the memory segment transfer between the virtual machine on the source location machine and the virtual machine on the target location machine. However, in other exemplary embodiments, the proxy machine is an agent that executes the memory segment transfer protocols. In various embodiments according to this invention, the proxy machine C is chosen statically ahead of time. However, in still other embodiments, the proxy machine C is dynamically determined when a live application migration is initiated.

In another exemplary embodiment according to this invention, multiple proxy machines $C_1, C_2, \ldots, C_n$ are selected. The memory segments are then transferred in parallel over the communication links between the source location machine A and the plurality of proxy servers $C_1, C_2, \ldots, C_n$. These parallel transfers are synchronized with the target location machine B. The amount of data transferred between the source location machine A and a proxy machine $C_i$ is determined based on the proportional bandwidth between A and $C_i$. The demand paging phase would require the target location machine B to determine the correct node for the missing memory segment as the memory segment may be not with target location machine A but with another proxy machine $C_j$. This would require that when proxy machine $C_j$ responds with the correct memory segment, it ensures the request memory segment has not been updated or changed. That is, the proxy machine $C_j$ ensures that the live application on the source machine has not updated or changed the requested memory segment since the request memory segment was copied to the proxy machine $C_j$.

FIG. 1 is an overview of a live application migration. During the live application transfer, some memory segments at the source location machine may be updated by the currently executing live application. Additional transfers will be required to ensure newly updated or changed memory segments are synchronized with the memory segments at the target location machine.

Figure 2:
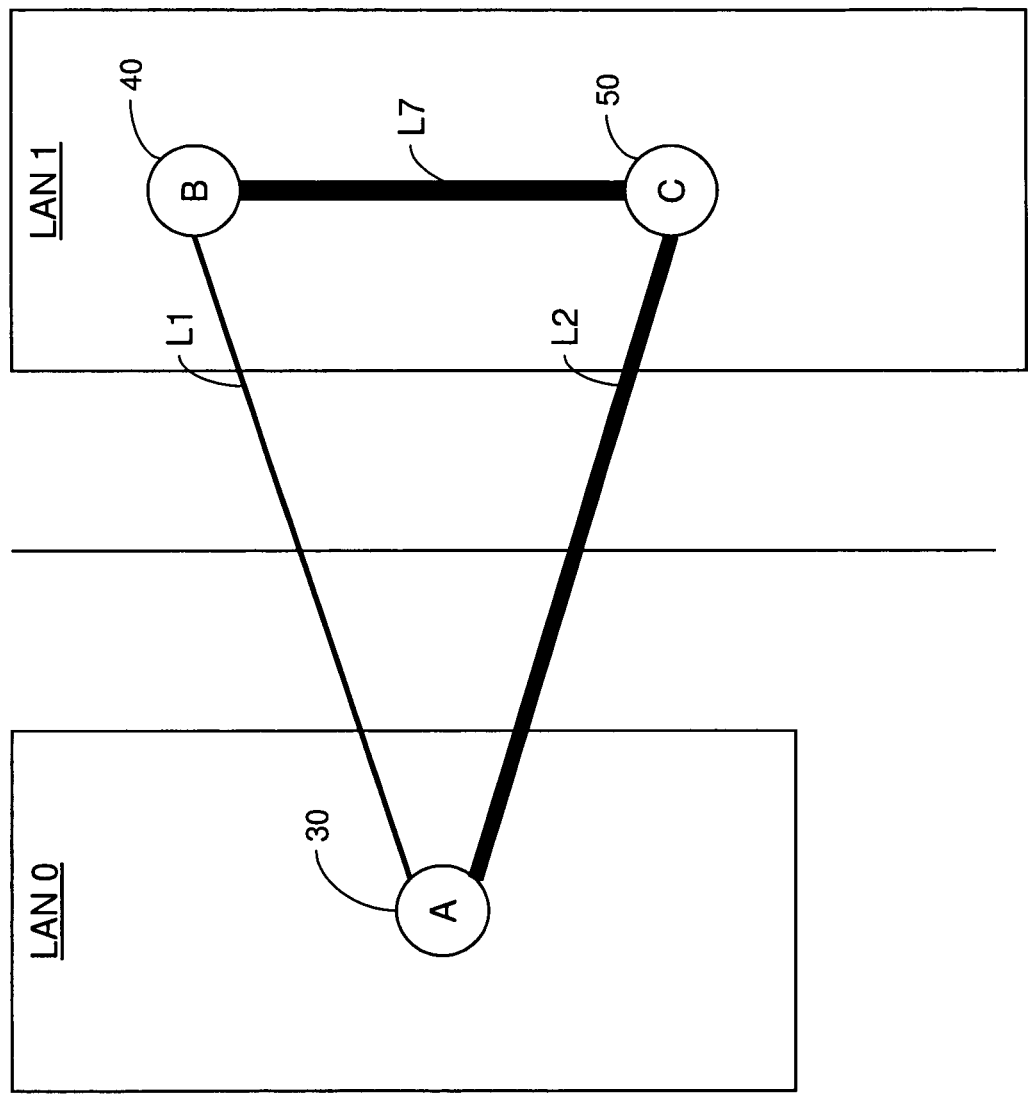
FIG. 2 is a first exemplary embodiment of an efficient live application migration within bandwidth constrained networks according to an aspect of this invention.

FIG. 2 is a first exemplary embodiment of an efficient live application migration within bandwidth constrained networks according to an aspect of this invention. A source location machine A 30 is located within source location LAN 0. A live application running on the source location machine A 30 is scheduled for migration to a target location machine B 40 within LAN 1. A higher speed communication link L2 exists between the source location machine A 30 and a proxy machine C 50 where the proxy machine C 50 is within the same local area network (LAN 1) as the target machine B 40 and a communication link L7 between the proxy machine C 50 and the target machine B 40 is of higher speed than the communication link L1 between the source machine A 30 and the target machine B 40.

In various exemplary embodiments according to this invention, the communications links are high speed fiber optic links connecting LAN 0 and LAN 1. However, it will be apparent that various other known or later developed communication media useful in transmitting the live application may also be used without departing form the spirit or scope of this invention.

In still other embodiments according to this invention, a data capture component monitors and captures information associated with one or more data records. The records change while the associated database management manager or application is executing. A frequency ranking component orders the records in an order determined by record change frequency (how often the record changes). A link identification component identifies one or more peer machines. Each set of machines connects the source machine to the target machine. The link identifier further determines the bandwidth associated with each connecting link. A ranking component preferentially routes the one or more records over the connecting links based on the order so that the record that changes most frequently is moved on a high bandwidth link and the record that changes least frequently is moved on a low bandwidth link.

In one exemplary embodiment, the system for efficient live application migration (not shown) is interposed within the source location machine A 30. The system for efficient live application migration manages the transfer of information between the source location machine A 30 and the target location machine B 40 over the direct communication link L1 and the high speed communication links L2 and L7 by ensuring that memory segment associated with frequent changes or updates are assigned to the higher speed communication links. This ensures communication bandwidth is available to re-transmit memory segments that have been updated by the live application. That is, the assignment of a more frequently changing memory segment to higher speed communication link ensures that more bandwidth is available for memory segments most likely to require re-transmissions.

Figure 3:
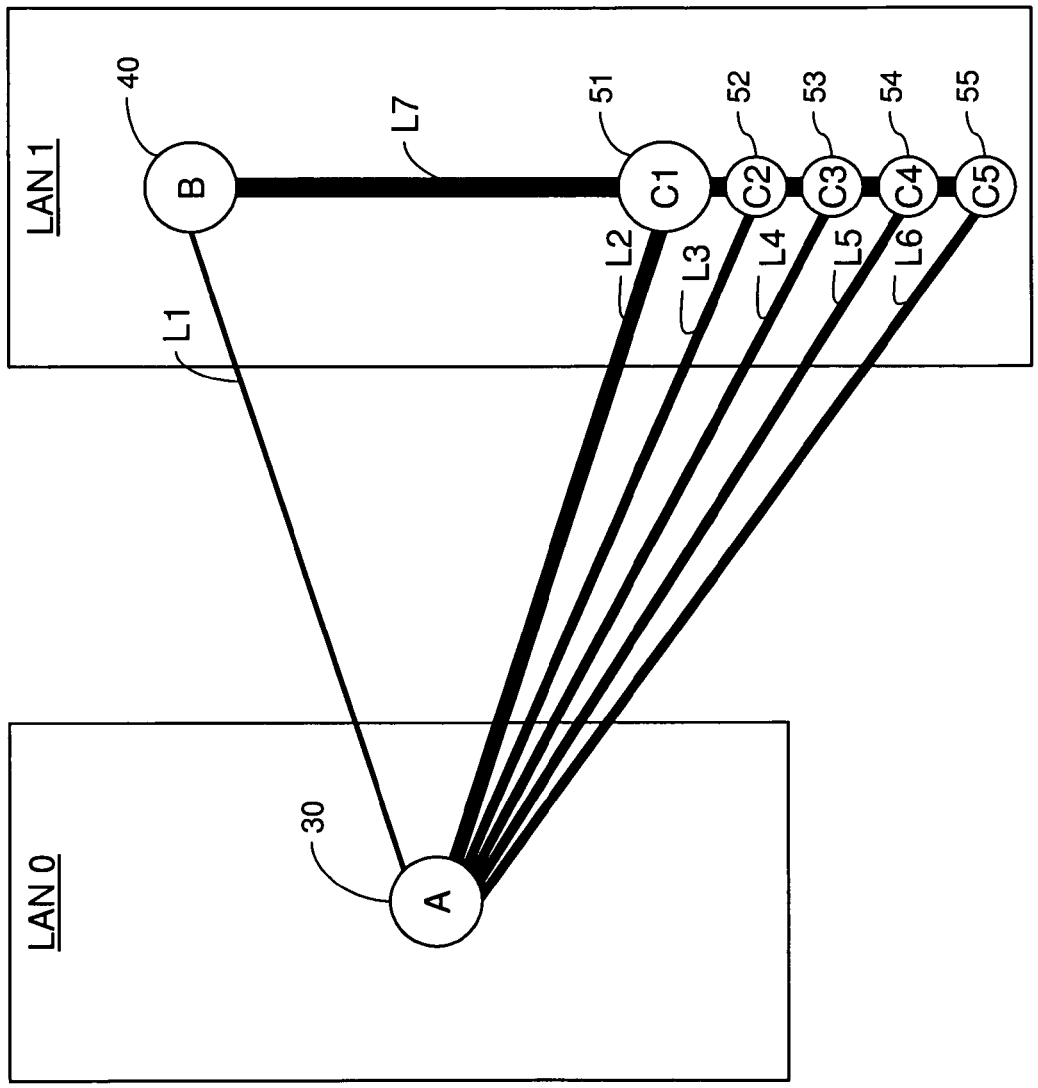
FIG. 3 is a second exemplary embodiment of an efficient live application migration within bandwidth constrained networks according to an aspect of this invention.

FIG. 3 is a second exemplary embodiment of an efficient live application migration within bandwidth constrained networks according to an aspect of this invention. The source location machine A 30 within LAN 0 is connected to a target machine B 40 within LAN 1. The source location machine A 30 is also connected to proxy servers $C_1$-$C_5$ 51-55 respectively. In one exemplary embodiment, each of the links L2-L6 between the source location machine and the proxy server machines $C_1$-$C_5$ 51-55, and the communications links between the proxy server machines and the target location machine B 40 are associated with higher bandwidth than the communication link between the source location machine A 30 and the target machine B 40.

The system for efficient bandwidth constrained live application migration (not shown) interposed within the source location machine A 30 performs the live application migration by assigning frequently changing memory segments to the highest speed communications links. This ensures that when a memory segment is updated during the live application migration, the synchronization with memory segments previously transmitted to the target location machine B 40 occurs more quickly. This in turn minimizes the likelihood that additional memory segment updates on the source location machine A 30 may further delay the live migration.

Figure 4:
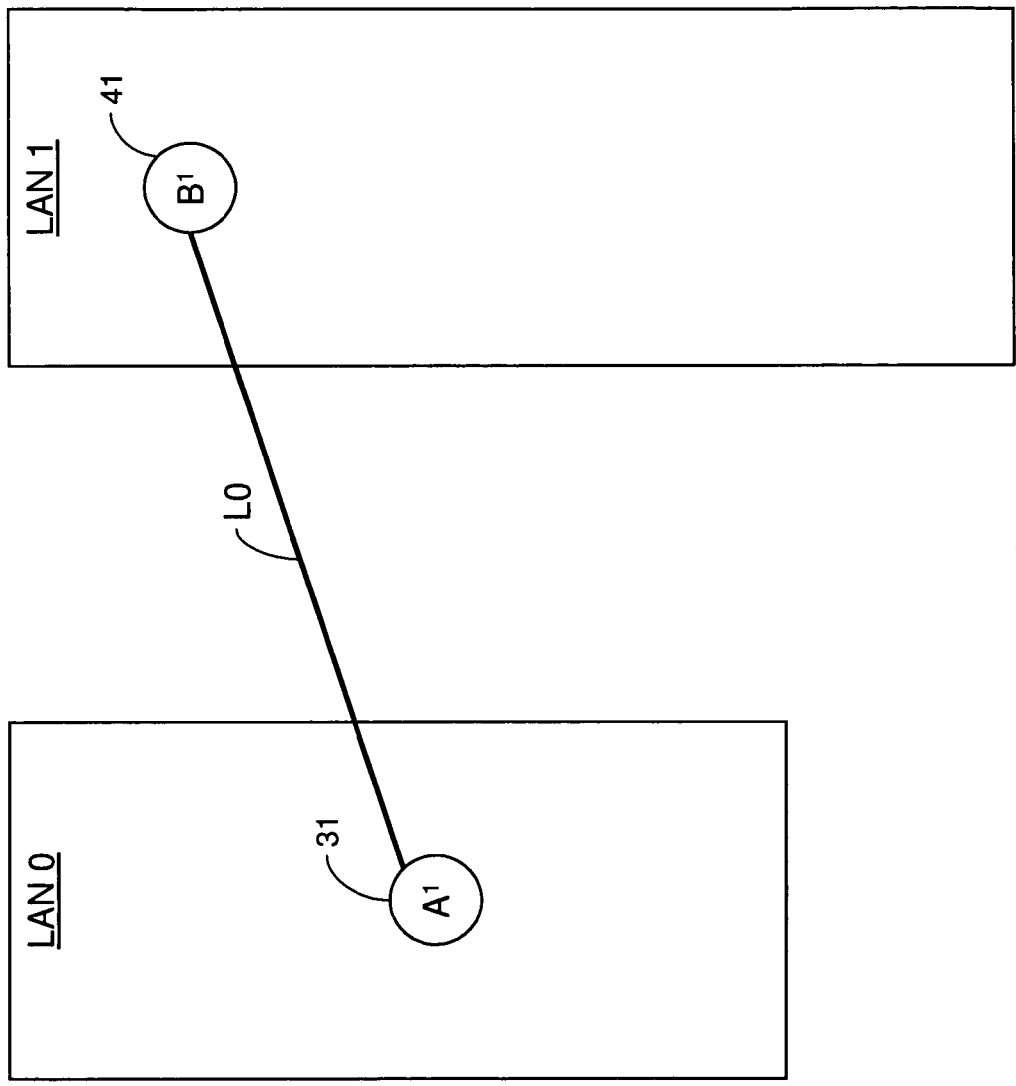
FIG. 4 is an embodiment of a conventional live application migration.

FIG. 4 is an embodiment of a conventional live application migration. The source location machine $A^1$ 31 initiates the migration of a live application to a target location machine $B^1$ 41 over communication link L0. During the live application process the memory segments are transmitted from the source location machine $A^1$ 31 to the target location machine $B^1$ 41. However, the live application continues to run after the transfer of the memory segments but before the live application migration has completed. Thus, updates to the memory segments in the live but not yet transferred application will require re-copying the memory segments. In this situation the more active an application is during the transfer the less likely it is that the transfer will complete efficiently without re-transmissions. The re-transmissions will induce further delays in completing the transfer which in turn further increase the likelihood that additional updates to the memory segments of the live application will be required.

FIG. 5 is an exemplary data structure for storing memory-change frequency information according to an aspect of this invention. The exemplary data structure for storing memory-change frequency information 60 is comprised of a memory segment identifier portion 61 and a change frequency portion 62.

The memory segment identifier portion of the exemplary data structure for storing memory-change frequency information 60 identifies unique portions of memory associated with the migrating live application. The change frequency portion 62 identifies how quickly the specified memory segment has changed in the past. That is, each row of the exemplary data structure for storing memory-change frequency information 60 associates a memory segment with a change frequency.

The first row of the exemplary data structure for storing memory-change frequency information 60 contains the value "1" in the memory segment identifier portion 41 and the value "1" in the change frequency portion 62. This indicates that memory segment "1" is associated with a low number of changes. It will be apparent that in various other embodiments according to this invention, other scales or measures of change-frequency may also be used without departing from the spirit or scope of the invention. That is, different scales may be used to indicate the frequency of change without departing from the scope of the invention.

The fifth row of the exemplary data structure for storing memory-change frequency information 60 contains the value "5" in the memory segment identifier portion 61 and the value "8" in the change frequency portion 62. This indicates that memory segment "5" is associated with a medium number of changes (assuming a scale of 1-10). Thus, memory segment 5 is assigned to a higher bandwidth link then memory segment 1.

The sixth row of the exemplary data structure for storing memory-change frequency information 60 contains the value "6" in the memory segment identifier portion 61 and the value "10" in the change frequency portion 62. This indicates that memory segment "6" is associated with a high number of changes. Thus, based on the associated high frequency of change, memory segment 6 is assigned to a higher bandwidth link.

The tenth row of the exemplary data structure for storing memory-change frequency information 60 contains the value "10" in the memory segment identifier portion 61 and the value "5" in the change frequency portion 62. This indicates that memory segment "10" is also associated with a high number of changes. Memory segment 10, associated with a high frequency of change is therefore also assigned to a higher bandwidth link.

Similarly, the memory segment identifier portions 61 of the second through fourth, seventh through ninth and eleventh through twelfth rows of the exemplary data structure for storing memory-change frequency information 60 contains the unique values "1" and "2" in the change frequency portion 62. This indicates that memory segments 2-4, 7-9 and 11-12 are associated with a low change frequency. These memory segments are therefore assigned to one or more lower bandwidth links.

FIG. 6 is an exemplary data structure for storing link-bandwidth information according to an aspect of this invention. The exemplary data structure for storing link-bandwidth information 70 is comprised of a link identifier portion 71 and a bandwidth portion 72. The link identifier portion 71 contains an identifier uniquely identifying each of the links to use in the live application migration. The bandwidth portion 72 indicates the bandwidth associated with each link. In one of the exemplary embodiments according to this invention, the bandwidth value indicates the actual bandwidth of each of the associated links. However, in various other embodiments according to this invention, the bandwidth value of the exemplary data structure for storing link-bandwidth information indicates the relative bandwidth of the link compared to the bandwidth of one or more other links selected to facilitate the transfer of the live application.

The first row of the exemplary data structure for storing link-bandwidth information 70 contains the value "1" in the link identifier portion 71 and the value "10" in the bandwidth portion 72. These values indicate that link "1" is associated with a bandwidth value of "10". In one embodiment, link 1 is associated with the constrained bandwidth between a source location machine and a target location machine.

Similarly, the second row of the exemplary data structure for storing link-bandwidth information 70 contain the values "2" and "100" indicating link "2" is associated with a bandwidth value of "100". In one of the exemplary embodiments according to this invention, link 2 is associated with a high bandwidth link between a source location machine and a proxy machine.

The seven row of the exemplary data structure for storing link-bandwidth information 70 contains the values "7" and "200" in the link identifier portion 71 and the bandwidth portion 72 respectively. In one exemplary embodiment according to this invention, these values are associated with a link within the target LAN that connects one or more proxy servers to the target location machine.

The third through the sixth rows of the exemplary data structure for storing link-bandwidth information 70 contain unique link identifiers in the link id portion 71 and the value "30" in the corresponding bandwidth portions 72. This indicates additional proxies higher in speed than the direct link but lower than the primary proxy link 2. These values indicate medium speed links between the source location machine and proxy servers in the target LAN1.

FIG. 7 is an exemplary data structure for storing link-memory segment information according to an aspect of this invention. The exemplary data structure for storing link-memory segment information 80 is comprised of a link identifier portion 81 and a memory segment identifier portion 82.

The link identifier portion 81 uniquely identifies the links involved in the live application as discussed above. The memory segment identifier uniquely identifies memory segments within an application to be migrated. The exemplary data structure for storing link-memory segment information 80 associates uniquely identified links with uniquely identified memory segments.

The first row of the exemplary data structure for storing link-memory segment information 80 contains the value "1" in the link identifier portion 81, and the values "1, 2" in the memory segment identifier portion 82. This indicates that uniquely identified live application memory segments "1" and "2" are assigned to link "1". Memory segments "1" and "2" are associated with a low frequency of change. Thus, memory segments "1" and "2" are assigned to link "1" associated with a lower bandwidth.

In contrast, the second row contains information associating memory segments "5" and "6" with link "2". Link "2" is associated with higher communication link bandwidth. Thus, any updates to memory segments that occur within the live application after the initial copy of the memory segment but before the migration has completed are more quickly transmitted to the target location machine over the higher bandwidth of communication link "2".

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

The embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code software associated with the invention will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
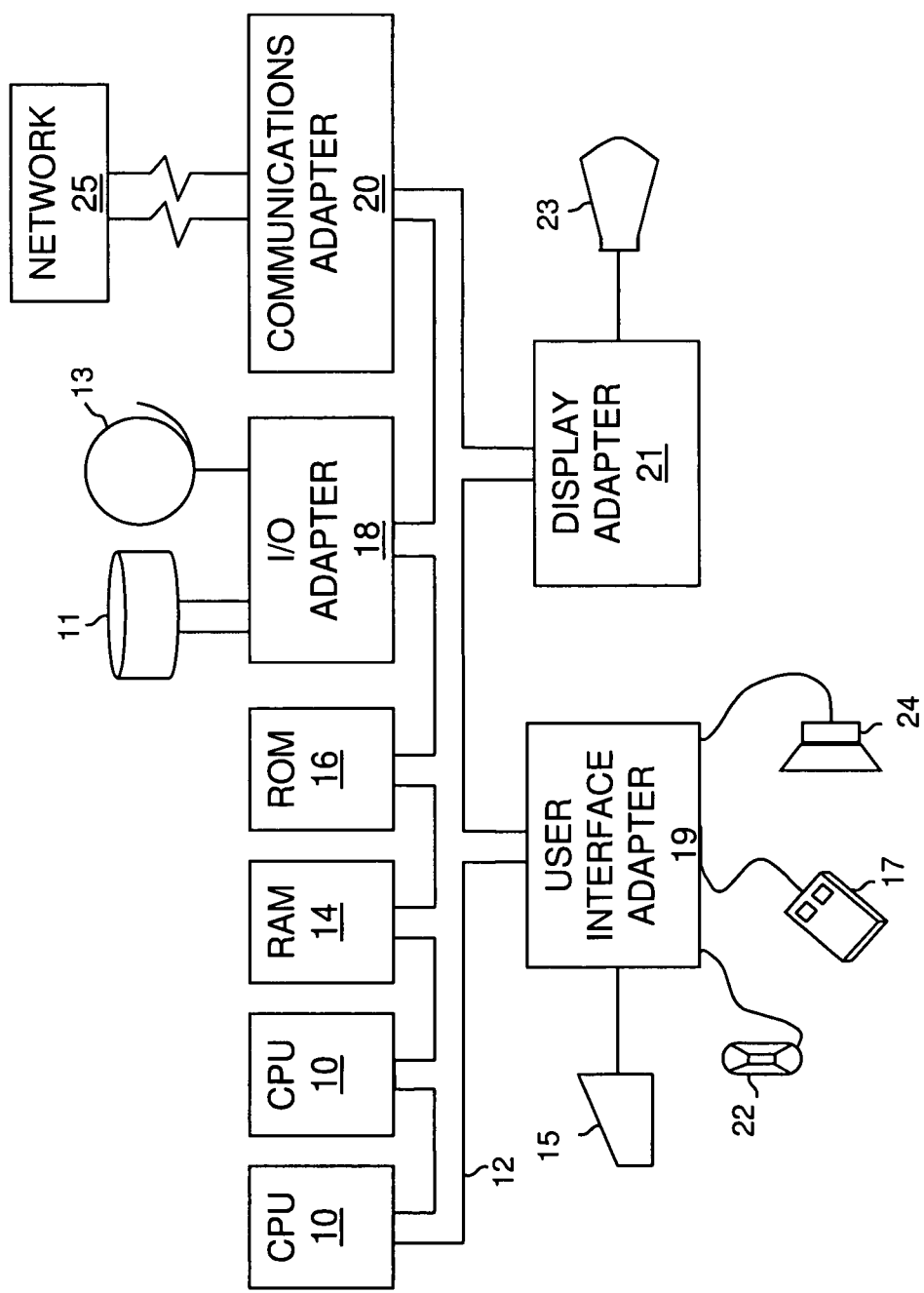
FIG. 8 is a schematic diagram illustrating an exemplary hardware environment that can be used to implement the embodiments of the invention.

A representative hardware environment for practicing the embodiments of the invention is depicted in FIG. 8. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer-implemented method for transferring a running application from a source machine to a target machine comprising:
    capturing memory segments associated with one or more memories within a computer storage medium, one or more sets of said memory segments comprising one or more applications, said memory segments changing while said running application is in execution;
    ranking and organizing said memory segments in an order determined by memory segment change frequency using a processor operatively connected to said computer storage medium;
    identifying one or more connecting links to one or more sets of peer machines using said processor, each set of peer machines connecting said source machine to said target machine, each of said connecting links having a bandwidth; and
    preferentially routing one or more of said memory segments over said connecting links based on said order, wherein memory segments associated with a higher change frequency are preferentially assigned to links associated with a higher bandwidth.

2. The method of claim 1, wherein memory segments are assigned to said connecting links in a monotonically decreasing order of change frequency and bandwidth.

3. The method of claim 1, wherein said one or more sets of peer machines only execute memory segment transfer protocols.

4. The method of claim 3, wherein said memory segment transfer protocols are implemented in at least one of: a proxy, an application and a network layer.

5. The method of claim 1, further comprising calculating said bandwidth by determining latency and quality of each of said connecting links.

6. The method of claim 1, wherein said running application comprises a virtual machine.

7. The method of claim 1, wherein said running application comprises an application executing within a virtual machine.

8. The method of claim 1, wherein said preferentially routing one or more of said memory segments first transfers clean unused pages from said source machine to said target machine.

9. A non-transitory program storage medium readable by machine tangibly embodying a program of instructions executable by said machine for performing a method for transferring a running application from a source machine to a target machine, said method comprising:
    capturing memory segments associated with one or more memories within a computer storage medium, one or more sets of said memory segments comprising one or more applications, said memory segments changing while said running application is in execution;
    ranking and organizing said memory segments in an order determined by memory segment change frequency using a processor operatively connected to said computer storage medium;
    identifying one or more connecting links to one or more sets of peer machines using said processor, each set of peer machines connecting said source machine to said target machine, each of said connecting links having a bandwidth; and
    preferentially routing one or more of said memory segments over said connecting links based on said order.

10. The non-transitory program storage medium of claim 9, wherein memory segments are assigned to said connecting links in a monotonically decreasing order of change frequency and bandwidth.

11. The non-transitory program storage medium of claim 9, wherein said one or more sets of peer machines only execute memory segment transfer protocols.

12. The non-transitory program storage medium of claim 11, wherein said memory segment transfer protocols are implemented in at least one of: a proxy, an application and a network layer.

13. The non-transitory program storage medium of claim 9, further comprising calculating said bandwidth by determining latency and quality of each of said connecting links.

14. The non-transitory program storage medium of claim 9, wherein said preferentially routing one or more of said memory segments first transfers clean unused pages from said source machine to said target machine.

15. A system comprising a computerized device for transferring a running application from a source machine to a target machine, said system comprising:
    a memory capture component of said computerized device that monitors and captures memory segments associated with one or more memories, one or more sets of said memory segments comprising one or more applications, said memory segments changing while said running application is in execution;

a frequency ranking component of said computerized device that organizes said memory segments in an order determined by a change frequency of each of said memory segments;

a link identification component of said computerized device that identifies one or more connecting links to one or more sets of peer machines, each set of peer machines connecting said source machine to said target machine, each of said connecting links having a bandwidth link; and a routing component of said computerized device that preferentially routes one or more of said memory segments over said connecting links based on said order.

16. The system of claim 15, wherein memory segments associated with higher change frequency are preferentially assigned to links associated with higher bandwidth.

17. The system of claim 15, wherein memory segments are assigned to said connecting links in a monotonically decreasing order of change frequency and bandwidth.

18. The system of claim 15, wherein said one or more sets of peer machines only execute memory segment transfer protocols.

19. The system of claim 18, wherein said memory segment transfer protocols are implemented in at least one of: a proxy, an application and a network layer.

20. The system of claim 15, said link identification component calculating said bandwidth by determining latency and quality of each of said connecting links.

21. The system of claim 15, wherein said running application comprises a virtual machine.

22. The system of claim 15, wherein said running application comprises application executing within a virtual machine.

23. The system of claim 15, wherein said routing component first transfers clean unused pages from said source machine to said target machine.

24. A system comprising a computerized device for transferring a running application from a source machine to a target machine, said system comprising:

a data capture component of said computerized device that monitors and captures records, one or more sets of said records comprising one or more applications, said records changing while said running application is in execution;

a frequency ranking component of said computerized device that organizes said records in an order determined by record change frequency of each of said records;

a link identification component of said computerized device that identifies one or more connecting links to one or more sets of peer machines, each set of peer machines connecting said source machine to said target machine, each of said connecting links having a bandwidth; and a routing component of said computerized device that preferentially routes one or more of said records over said connecting links based on said order.

* * * * *